United States Patent
Fukano et al.

[19]

[11] Patent Number: 5,951,060
[45] Date of Patent: Sep. 14, 1999

[54] PIPE JOINT

[75] Inventors: Yoshihiro Fukano; Tetsuro Maruyama, both of Ibaraki-ken, Japan

[73] Assignee: SMC Kabushiki Kaisha, Tokyo, Japan

[21] Appl. No.: 08/815,513

[22] Filed: Mar. 12, 1997

[30] Foreign Application Priority Data

Mar. 22, 1996 [JP] Japan ................................ 8-066762

[51] Int. Cl.⁶ .................................................. F16L 15/08
[52] U.S. Cl. .......................... 285/92; 285/332; 285/354; 285/423; 285/906
[58] Field of Search .................... 285/354, 332, 285/331, 423, 318, 334.1, 353, 92, 906

[56] References Cited

U.S. PATENT DOCUMENTS

| | | |
|---|---|---|
| 3,116,944 | 1/1964 | Parker . |
| 3,679,237 | 7/1972 | De Angelis .......................... 285/353 X |
| 3,977,708 | 8/1976 | Jopp ..................................... 285/423 X |
| 4,162,092 | 7/1979 | Hayes .................................. 285/423 X |
| 4,219,222 | 8/1980 | Brusadin ............................. 285/423 X |
| 4,606,564 | 8/1986 | Kurachi ............................... 285/318 X |
| 4,666,190 | 5/1987 | Yamabe et al. ...................... 285/423 X |
| 4,842,309 | 6/1989 | LaVene et al. ........................... 285/353 |
| 4,848,804 | 7/1989 | Weigl ................................... 285/354 X |
| 5,154,453 | 10/1992 | Nishio ................................. 285/423 X |

FOREIGN PATENT DOCUMENTS

| | | |
|---|---|---|
| 0 365 821 | 5/1990 | European Pat. Off. . |
| 0 473 807 | 3/1992 | European Pat. Off. . |
| 2 373 012 | 6/1978 | France . |
| 2 385 969 | 10/1978 | France . |
| 20 45 870 | 2/1972 | Germany . |
| 7-20471 | 5/1995 | Japan . |
| 2129081 | 5/1984 | United Kingdom ................... 285/353 |

*Primary Examiner*—Dave W. Arola
*Attorney, Agent, or Firm*—Oblon, Spivak, McClelland, Maier & Neustadt, P.C.

[57] ABSTRACT

A pipe joint has a body having a through hole defined axially therein as a fluid passage, a nut threaded on the joint body thereby connecting the pipe to the joint body, and a sleeve held against a bottom of a hole defined in the joint body by an annular step surface and having a bulging portion slanting at a predetermined angle. The nut has a radially inner pipe presser which is bent and flexed into a shape complementary to the bulging portion when the nut is progressively threaded over the joint body, for pressing an end of the pipe against the sleeve under a resilient force tending to return the radially inner pipe presser to an original shape thereof.

10 Claims, 3 Drawing Sheets

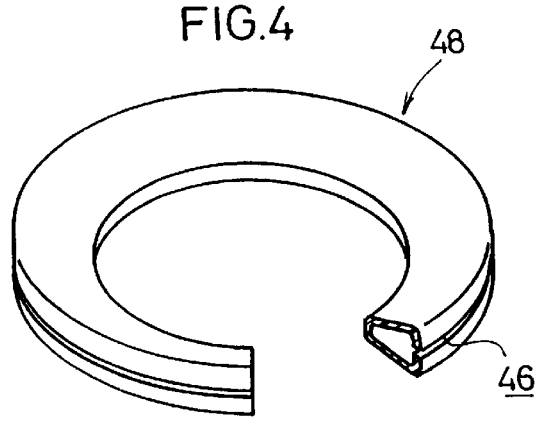
FIG.4
PRIOR ART
FIG.5
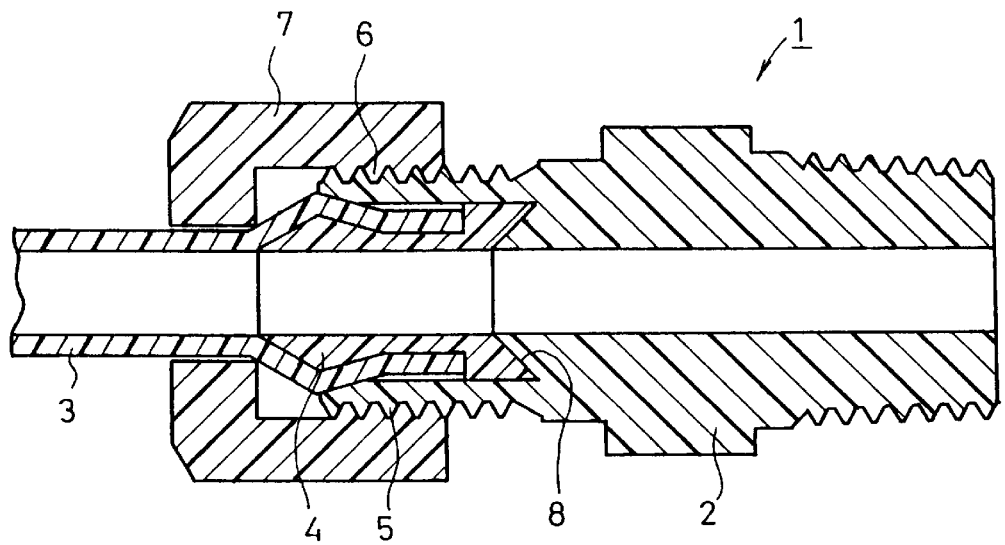

PIPE JOINT

BACKGROUND OF THE INVENTION

1. Field of the Invention

The present invention relates to a pipe joint for connecting a pipe hermetically to a fluid pressure device.

2. Description of the Related Art

One conventional pipe joint of synthetic resin disclosed in Japanese utility model publication No. 7-20471, for example, is shown in FIG. 5 of the accompanying drawings.

As shown in FIG. 5, the known pipe joint of synthetic resin, generally designated by the reference numeral 1, has a cylindrical joint body 2 and an inner ring 4 inserted in a hole defined in the cylindrical joint body 2 and force-fitted in an end of a pipe 3. The cylindrical joint body 2 has an externally threaded end 5 in which the inner ring 4 is inserted. A pusher ring 7 has an internally threaded end 6 which is threaded over the externally threaded end 5. The pipe 3 extends axially through the pusher ring 7 and is axially engaged by the pusher ring 7.

The inner ring 4 has an inner end held against the inner end of the hole in the cylindrical joint body 2, providing a seal region 8. The seal region 8 is firmly pressed by the inner ring 4 which is pushed axially inwardly by the pipe 3 that is forcibly axially pressed by the pusher ring 7, thereby firming sealing the passages in the cylindrical joint body 2 and the pipe 3 against leakage.

Each of the externally threaded end 5 and the internally threaded end 6 which are held in threaded engagement to hold the pusher ring 7 on the cylindrical joint body 2 has small screw teeth of triangular cross section. When heated by a fluid flowing through the pipe 3, the pusher ring 7 tends to be loosened on the cylindrical joint body 2, damaging the seal between the cylindrical joint body 2 and the pipe 3.

There has been a demand in the art for increasing the sealing capability of the pipe joint 2 of synthetic resin.

SUMMARY OF THE INVENTION

It is a general object of the present invention to provide a pipe joint which has an increased sealing capability.

A principal object of the present invention is to provide a pipe joint which has a structure capable of preventing a nut thereon from being unduly loosened.

Another object of the present invention is to provide a pipe joint which prevents a nut being unduly loosened even when heated by a fluid flowing through the pipe joint, thereby retaining a desired seal against leakage from the pipe joint.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a perspective view, partly cut away, of a ring which may be used as the spring shown in FIG. 2; and FIG. 5 is a longitudinal cross-sectional view of a conventional pipe joint.

DETAILED DESCRIPTION OF THE PREFERRED EMBODIMENTS

Figure 1:
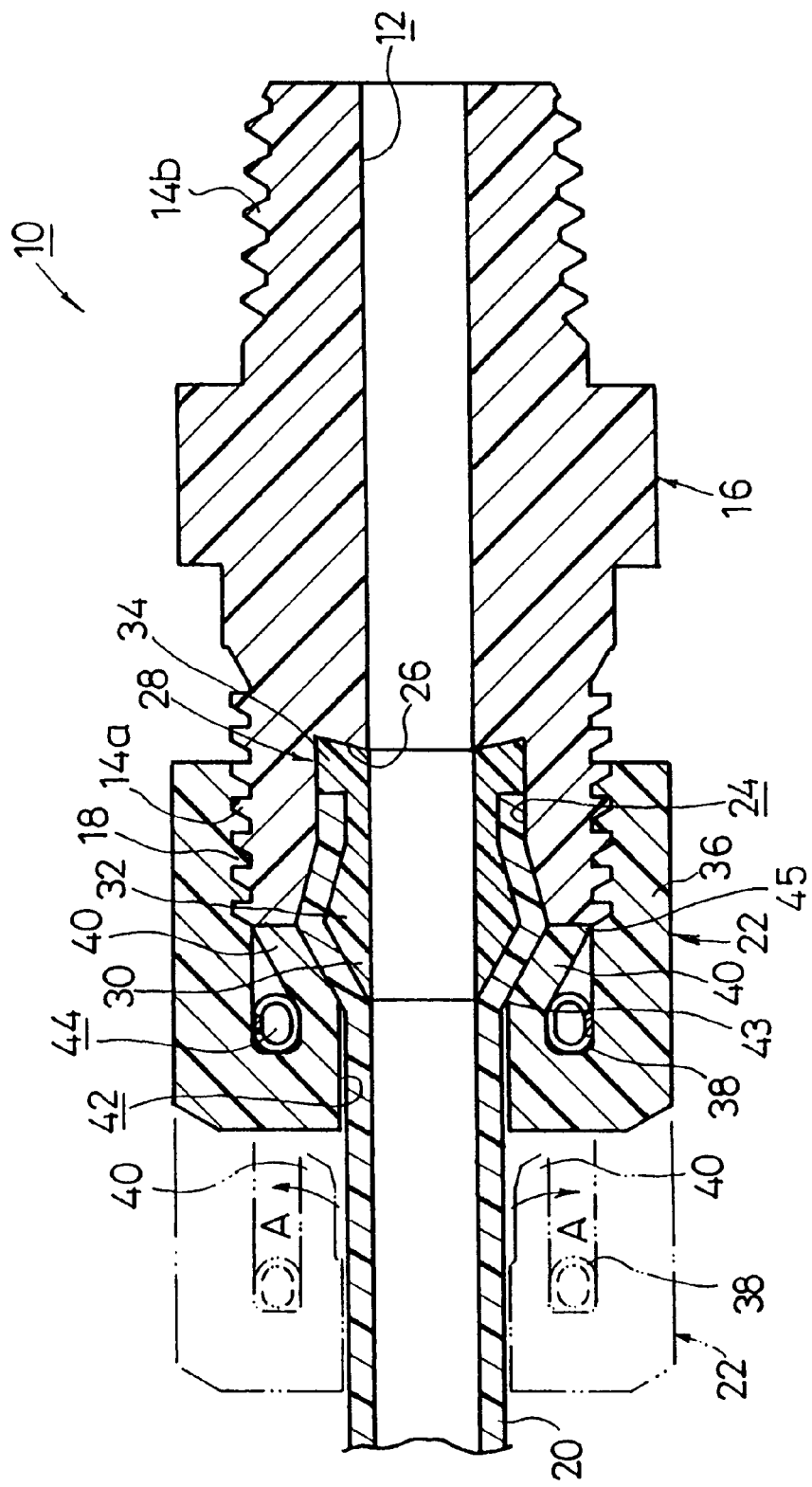
FIG. 1 is a longitudinal cross-sectional view of a pipe joint according to the present invention.

As shown in FIG. 1, a pipe joint 10 according to the present invention comprises a cylindrical joint body 16 having a through hole 12 defined axially therein as a fluid passage and first and second externally threaded opposite ends 14a, 14b, and a nut 22 having an internally threaded end 18 threaded over the first externally threaded end 14a and fitted over an end of a pipe 20, thereby retaining the pipe 20 on the cylindrical joint body 16. The first externally threaded end 14a has screw teeth of trapezoidal cross section on its outer circumferential surface and the internally threaded end 18 has screw grooves of trapezoidal cross section in its inner circumferential surface.

The cylindrical joint body 16 has a hole defined by an annular inner step surface 24 positioned radially inwardly of the first externally threaded end 14a and progressively tapered axially toward an inner end thereof. A sleeve 28 is inserted in the hole and has an inner end held against a bottom 26 of the hole. The sleeve 28 has an outer sharply pointed end 30 of sharply pointed cross section, a bulging portion 32 extending axially inwardly from the sharply pointed end 30 and slanting radially outwardly at a predetermined angle from the sharply pointed end 30, and an annular flange 34 extending axially inwardly from the bulging portion 32 and projecting radially outwardly from the inner end of the sleeve 28.

Figure 3:
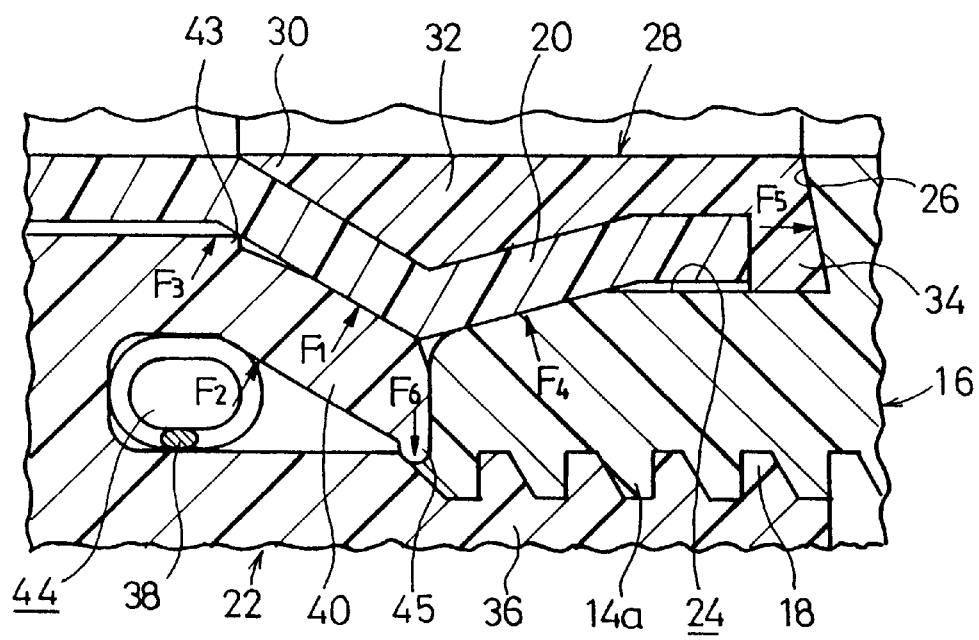
FIG. 3 is an enlarged fragmentary cross-sectional view the pipe joint according to the present invention.

The nut 22 comprises a cylindrical member 36 which has the internally threaded end 18 and a radially inner annular pipe presser 40 extending from an end of the nut 22 opposite to the internally threaded end 18 toward the internally threaded end 18 and flexibly bent radially outwardly (in the direction indicated by the arrow A) along the sharply pointed end 30 and the bulging portion 32. The annular pipe presser 40 presses the pipe 20 radially inwardly against the bulging portion 32 under resilient forces. The cylindrical member 36 and the pipe presser 40 are integrally formed as a unitary structure. The pipe presser 40 has an axial hole 42 defined therein with the pipe 20 inserted therein. The pipe presser 40 also has an annular tooth 43 (see also FIG. 3) projecting radially inwardly into the hole 42.

The pipe presser 40 further includes an annular ridge 45 (see also FIG. 3) projecting radially outwardly from an inner wall end thereof. The annular ridge 45 is held against and presses radially outwardly an inner circumferential surface of the cylindrical member 36.

Figure 2:
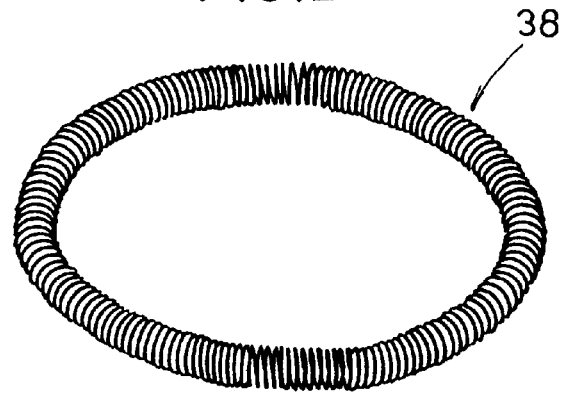
FIG. 2 is a perspective view of a spring in the pipe joint according to the present invention.

An annular space 44 is defined between the cylindrical member 36 and the pipe presser 40. The annular space 44 houses therein an annular helical spring (resilient member) 38 (see also FIG. 2). The annular helical spring 38 comprises a helically coiled filamentary element of stainless steel, for example.

Each of the cylindrical joint body 16, the nut 22, the sleeve 28, and the pipe 20 is formed of a synthetic resin such as polytetrafluoroethylene (PTFE), for example.

The pipe joint 10 of the above structure operates and offers advantages as follows:

The sharply pointed end 30 and the bulging portion 32 of the sleeve 28 are inserted into the end of the pipe 20. The sleeve 28 is forced into the end of the pipe 20 until an axial end of the flange 34 abuts against the end of the pipe 20. With the sleeve 28 forcibly placed in the end of the pipe 20, the end of the pipe 20 is enlarged radially outwardly into a shape complementary with the sharply pointed end 30 and the bulging portion 32, holding the inner circumferential surface of the pipe 20 and the outer circumferential surface of the sleeve 28 hermetically together. Then, the end of the pipe 20 in which the sleeve 28 has been forced is inserted into the hole defined in the cylindrical joint body 16 by the annular inner step surface 24, until an opposite axial end of the flange 34 is held against the bottom 26 of the hole in the cylindrical joint body 16.

The internally threaded end 18 of the nut 22, which has been loosely fitted over the pipe 20, is threaded over the first externally threaded end 14a, and the nut 22 is tightened to connect the pipe 20 hermetically to the cylindrical joint body 16.

Specifically, when the 22 is tightened on the end of the cylindrical joint body 16, the pipe presser 40 is bent and flexed radially outwardly in the direction indicated by the arrow A by the radially enlarged end of the pipe 20. The pipe 20 is pressed against the sleeve 28 under a force $F_1$ (see FIG. 3) tending to return the pipe presser 40 to its original shape. When the pipe presser 40 is bent radially outwardly in the direction indicated by the arrow A, it presses the spring 38 disposed in the annular space 44. The spring 38 then develops a resilient reactive force $F_2$ (see FIG. 3) which presses the pipe presser 40 toward the sleeve 28. The reactive force $F_2$ developed by the spring 38 produces a force $F_3$ (see FIG. 3) which causes the annular tooth 43 to press the pipe 20 toward the sharply pointed end 30 of the sleeve 28.

Stated otherwise, the forces $F_1$, $F_3$ which tend to cause the pipe presser 40 to press the pipe 20 substantially radially inwardly against the sleeve 28 are backed up by the resilient reactive force $F_2$ which is imposed by the spring 38 to press the pipe presser 40 against the pipe 20, and are equal to the sum of the resilient force of the pipe presser 40 and the resilient reactive force $F_2$ of the spring 38.

When the nut 22 is further tightened on the end of the cylindrical joint body 16, the end of the cylindrical joint body 16 develops a force $F_4$ (see FIG. 3) that tends to press the pipe 20 against the sleeve 28.

When the forces $F_1$, $F_2$, $F_3$, $F_4$ thus act to press the sleeve 28 radially inwardly of the pipe 20, a force $F_5$ (see FIG. 3) is developed to press the flange 34 of the sleeve 28 axially against the bottom 26 of the hole which defines the annular inner step surface 24 of the cylindrical joint body 16.

The pipe joint 10 according to the present invention is capable of sealing the joint between the pipe 20 and the cylindrical joint body 16 more effectively to prevent a fluid in the pipe joint 10 and the pipe 20 from leaking out than the conventional pipe joint.

The screw teeth of the first externally threaded end 14a have a trapezoidal cross-sectional shape, and the screw grooves of the internally threaded end 18 have a trapezoidal cross-sectional shape, unlike the screw teeth and grooves of triangular cross section in the conventional pipe joint. The annular ridge 45 of the pipe presser 40 which is held radially outwardly against the inner circumferential surface of the cylindrical member 36 applies a force $F_6$ (see FIG. 3) acting on the screw teeth of the first externally threaded end 14a and the screw grooves of the internally threaded end 18, holding the first externally threaded end 14a and the internally threaded end 18 firmly tightened with increased strength. Thus, the nut 22 is reliably prevented from being loosened up even when heated by the fluid flowing through the pipe joint 10 and the pipe 20.

The annular helical spring 38 may be replaced with a hollow ring 48 (see FIG. 4) of metal or synthetic resin which has an annular slit 46 defined in and extending along an outer circumferential wall thereof. The spring 38 or the ring 48 may be installed as required.

Although certain preferred embodiments of the present invention have been shown and described in detail, it should be understood that various changes and modifications may be made therein without departing from the scope of the appended claims.

What is claimed is:

1. A pipe joint comprising:
    a joint body having a through hole defined axially therein as a fluid passage and at least one threaded end, said joint body including an annular step surface;
    a pipe for connection to said joint body;
    a nut threaded on said at least one threaded end of said joint body and fitted over an end of said pipe; and
    a sleeve disposed in abutment with said annular step surface and having a bulging portion slanting at a predetermined angle, wherein said sleeve is fitted into said end of the pipe and deforms said pipe end into a bulging portion complementary to said bulging portion of said sleeve;
    said nut having a body and a radially inner pipe presser extending therefrom which bends and flexes into a shape complementary to said bulging portion of said pipe end as said nut is progressively threaded over said at least one threaded end of said joint body, causing said bulging portion of said pipe end to expand said pipe presser radially outwardly, for pressing said bulging portion of said end of said pipe against said bulging portion of said sleeve under a resilient force tending to restore said radially inner pipe presser to an unbent shape, thereby connecting said end of said pipe and said sleeve to said joint body.

2. A pipe joint according to claim 1, wherein said nut has an annular space defined therein intermediate said body and said pipe presser, further comprising a resilient member disposed in said annular space for developing a reactive force in response to being pressed by said pipe presser as said pipe presser is expanded radially outward by said sleeve, to press said presser toward said sleeve.

3. A pipe joint according to claim 2, wherein said resilient member comprises a ring made of a synthetic resin material.

4. A pipe joint according to claim 2, wherein said resilient member comprises an annular helical spring.

5. A pipe joint according to claim 2, wherein said resilient member comprises a metal ring.

6. A pipe joint according to claim 5, wherein said ring has an annular slit defined in and extending along a circumferential wall thereof.

7. A pipe joint according to claim 1, wherein said nut has a threaded end threaded on said at least one threaded end, said threaded ends having screw teeth and grooves of trapezoidal cross section.

8. A pipe joint according to claim 1, wherein said pipe presser is integrally formed with said nut.

9. A pipe joint according to claim 8, wherein said sleeve has a sharply pointed end from which said bulging portion extends, said pipe presser having an annular tooth which presses said pipe against said sharply pointed end when said nut is progressively threaded over said at least one threaded end of said joint body.

10. A pipe joint according to claim 8, wherein said nut has a cylindrical member, and said pipe presser has an annular ridge projecting from an end thereof which presses said cylindrical member radially outwardly when said nut is progressively threaded over said at least one threaded end of said joint body.

* * * * *